(No Model.)
G. D. ELGES.
VEHICLE WHEEL.
No. 466,776. Patented Jan. 12, 1892.
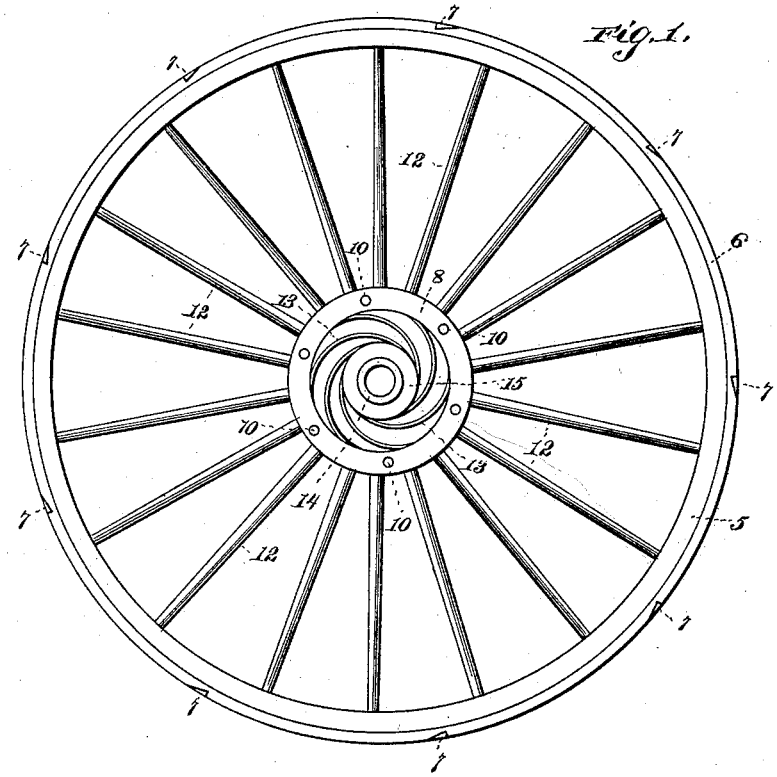
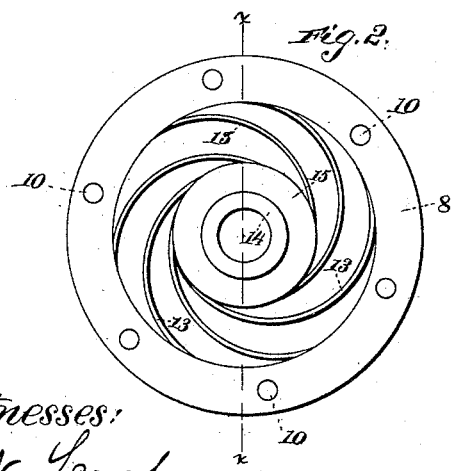
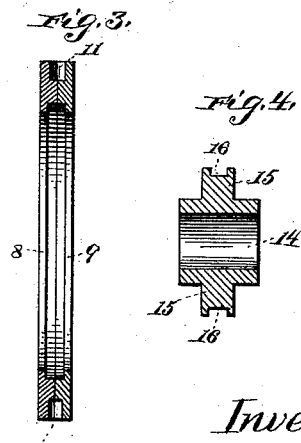
Witnesses:
F. W. Lerch.
Henry Dorman
Inventor:
Gottlieb D. Elges
per Wm K White
Attorney

UNITED STATES PATENT OFFICE.

GOTTLIEB D. ELGES, OF DAVENPORT, IOWA.

VEHICLE-WHEEL.

SPECIFICATION forming part of Letters Patent No. 466,776, dated January 12, 1892.

Application filed February 20, 1891. Serial No. 382,833. (No model.)

*To all whom it may concern:*

Be it known that I, GOTTLIEB D. ELGES, a citizen of the United States, residing at Davenport, in the county of Scott and State of Iowa, have invented a new and useful Vehicle-Wheel, of which the following is a specification.

My invention relates to vehicle-wheels in which the hubs are connected with the wheel by means of springs and the tire surrounding the felly is notched; and the objects of my improvement are, first, to provide a flexible wheel, and, second, to provide the tire with engaging-notches, so it may cross street-car tracks and other like obstructions at angles without danger of breaking the wheel. I attain these objects by the mechanism illustrated in the accompanying drawings, in which—

Figure 1 is a side view of the wheel. Fig. 2 is a side view of the interior spoke-holding ring, springs, and hub. Fig. 3 is a vertical section of the interior spoke-holding ring on the line X X, Fig. 2; and Fig. 4 is a vertical section of the hub on the line X X, Fig. 2, the springs being removed.

Similar letters and figures refer to similar parts throughout the several views.

5 is a felly of the wheel, surrounded by the tire 6, which at its outer edges is provided with notches 7. I construct an interior spoke-holding ring in two parts 8 and 9, securing the same together by screws or rivets 10. In the periphery of said ring, when the two parts are secured together, are constructed spoke-sockets 11. The interior surface of felly 5 is also provided with the usual spoke-sockets, and the spokes 12 connect such felly and interior spoke-holding ring by having their respective ends secured in such sockets. The flat curved springs 13 are secured at one end to the interior surface of the spoke-holding ring 8 and 9 by rivets or screws. The hub 14 is surrounded by a central projecting ring 15, having in its exterior surface or periphery a slot 16, the opposite ends of which flat curved springs 13 are secured therein by rivets or screws.

In operation the hub 14 is passed over and on the axle-box of the vehicle, and when the wheel in traveling strikes an obstruction the springs connecting the interior spoke-holding ring with the hub yield sufficiently, so the wheel may pass over the obstruction without jarring or vertically moving the hub to any material extent. The notches 7, when the wheel travels over the rail of a street-car track or similar obstruction at an angle other than a right angle, impinge on such obstruction and cause the wheel to travel over such obstruction and not to slide along the same.

I am aware that heretofore a wheel has been described in which the exterior of the hub was provided with two parallel outwardly-projecting flanges and with a spoke-holding ring provided with two parallel inwardly-projecting flanges, arranged to overlap the flanges on the hub, and such ring being connected with the wheel-rim by spokes, and the chamber formed between the exterior of the hub and the interior of the ring and between the flanges accommodating springs. I am also aware that in wheels where no springs are used it has been proposed to form angular depressions in the edges of the tire at suitable distances apart. I do not therefore claim such combinations, broadly.

I do not form a chamber between the hub and spoke-holding ring by means of flanges fitting together, in which chamber are located springs. Such construction prevents easy access to the springs, and the bottom edges of the flanges of the spoke-holding ring when in use are apt to strike the exterior of the hub and produce a jar or unpleasant sensation, and in using such flanges there is constant friction and wear by reason of the sides of the respective flanges rubbing against each other.

My invention involves the use of a spoke-holding ring without the inwardly-projecting parallel flanges and a hub without the outwardly-projecting parallel flanges, and while I have described upon the hub an outwardly-projecting ring 15, having in its periphery a slot 16 to receive an end of the spring, yet such ring and slot are not essential, and the hub may be constructed without the same.

The essential feature of my invention is to provide springs of such form, so that at their respective ends they may be rigidly attached to the hub and the interior of the spoke-holding ring, and thus prevent lateral or swaying movement of the felly and tire, and yet permit the hub to move in line out of the center of the hub-holding ring against the springs when the tire of the wheel is passing over rough or uneven surfaces. It will be observed if double-V-shaped springs be used their ends cannot be rigidly attached to the hub and interior of the spoke-holding ring, because by such arrangement the hub is held unyieldingly and there will be no spring or movement of the hub within the spoke-holding ring, and if conical coil-springs are used they will not prevent lateral or swaying movement of the felly and tire. Hence in all prior constructions it has been necessary to combine with the hub and spoke-holding ring parallel flanges or side plates to prevent such movement of the tire and felly. It will be also observed that if the respective ends of the springs be not attached to the hub and interior of the spoke-holding ring the hub will not rotate in unison with the balance of the wheel.

What I claim as new, and desire to secure by Letters Patent, is—

In a vehicle-wheel having an exterior rim, an interior spoke-holding ring, and a hub of less diameter than the latter, the rim and ring rigidly connected by spokes, the combination of flat curved springs, the inner ends of each on the inner curved face rigidly attached to the exterior surface of the hub in line at equal distances apart, and the outer ends of each on the outer curved face rigidly attached to the interior surface of the spoke-holding ring at equal distances apart, and the point of attachment of the inner and outer end of each spring being at an angle to each other, substantially as described.

GOTTLIEB D. ELGES.

Witnesses:
CHAS. L. HIBBARD,
JOHN HYLAND.